United States Patent [19]
Heitele et al.

[11] Patent Number: 4,588,390
[45] Date of Patent: May 13, 1986

[54] MEANS AND METHOD FOR PRODUCTION OF BOX BLANKS, BOXES FORMED THEREFROM AND APPARATUS USEFUL THEREWITH

[75] Inventors: Jurgen Heitele, Stuttgart; Rudolf Kemmler, Backnang, both of Fed. Rep. of Germany

[73] Assignee: Rotopack GmbH, Fed. Rep. of Germany

[21] Appl. No.: 499,824

[22] Filed: Jun. 1, 1983

Related U.S. Application Data

[63] Continuation-in-part of Ser. No. 498,716, May 27, 1983.

[51] Int. Cl. ................................................. B31B 1/64
[52] U.S. Cl. .................................. 493/133; 156/73.1; 493/189; 493/209
[58] Field of Search ............... 493/133, 189, 209, 220; 156/73.1, 73.4

[56] References Cited

U.S. PATENT DOCUMENTS

| | | |
|---|---|---|
| 3,376,796 | 4/1968 | Gordon . |
| 4,187,768 | 2/1980 | Suzuki ............................ 156/73.1 |
| 4,193,833 | 3/1980 | Young .............................. 156/73.1 |

FOREIGN PATENT DOCUMENTS

| | | |
|---|---|---|
| 2926175 | 1/1980 | Fed. Rep. of Germany . |
| 1380430 | 1/1975 | United Kingdom . |
| 1514914 | 6/1978 | United Kingdom . |

*Primary Examiner*—Leon Gilden
*Attorney, Agent, or Firm*—Wolf, Greenfield & Sacks

[57] ABSTRACT

Apparatus for sealing deformable sheet material blanks comprises ultrasonic energy means having a sonotrode mounted for relative movement toward and away from an anvil surface carrying projections thereon. The anvil projections enable maximizing sonic energy from the sonotrode to form rapid and efficient seals in carton blanks. The carton blanks preferably carry a varnish having thermoplastic solvents in a liquid vehicle with the solids being present in sufficient amount to form a thermoplastic seal when processed in the ultrasonic apparatus. The method of forming the carton blanks utilizes printing techniques to apply the varnish and preferably the novel ultrasonic apparatus to enable rapid seals with minimized requirement for ultrasonic energy application due to compressing of sheet material at the seals to be formed.

11 Claims, 6 Drawing Figures

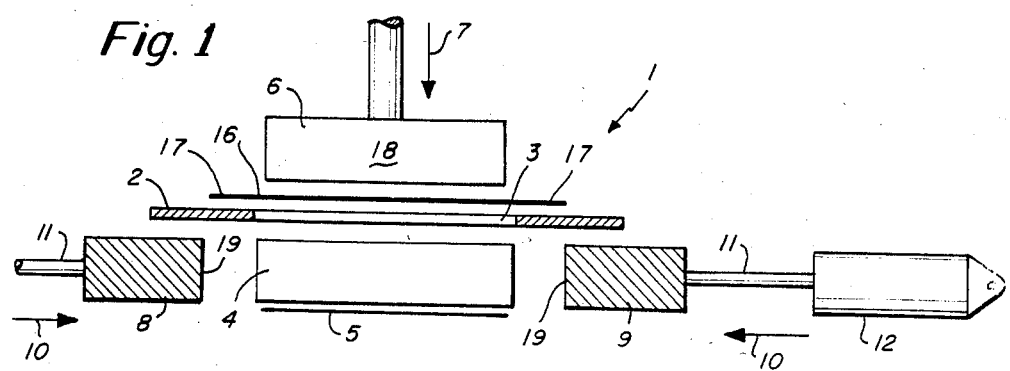
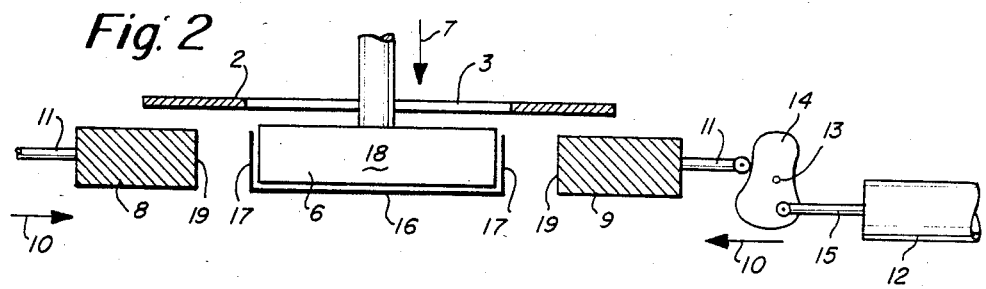
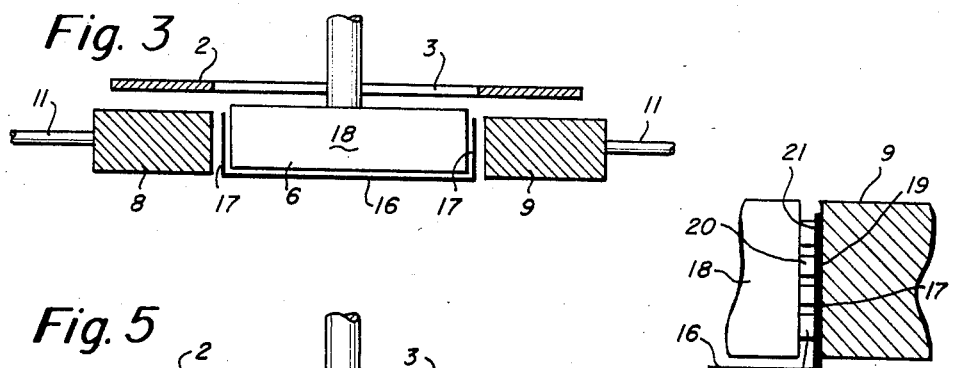
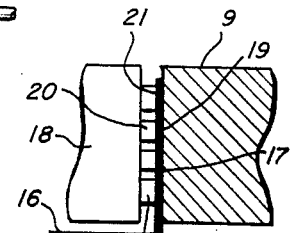
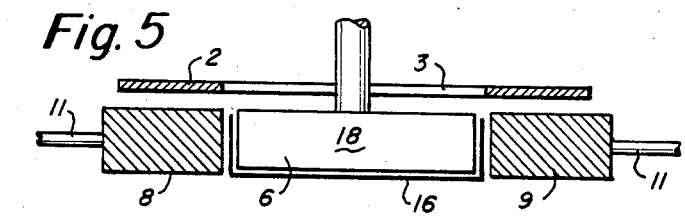
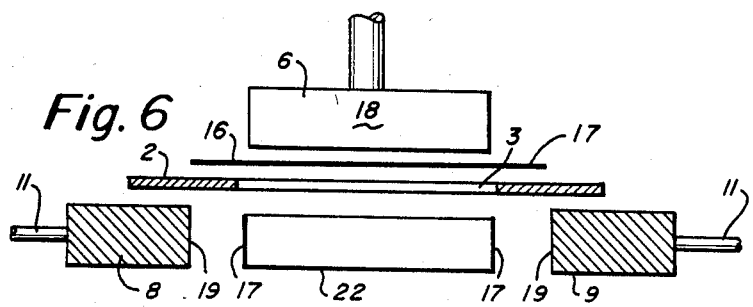

ent MEANS AND METHOD FOR PRODUCTION OF BOX BLANKS, BOXES FORMED THEREFROM AND APPARATUS USEFUL THEREWITH

RELATED APPLICATION

This application is a continuation-in-part of U.S. application Ser. No. 498,716 filed May 27, 1983 based on German patent applications No. G 82 15958.0 and No. P 32 46 325.1 filed June 2, 1982 and Dec. 15, 1982, respectively and entitled PRODUCTION PROCEDURE FOR THE MANUFACTURE OF BLANKS FOR PRODUCING FOLDING CARTONS AS WELL AS EQUIPMENT FOR THE ERECTING AND WELDING OF SAME naming the same inventors as this application.

BACKGROUND OF THE INVENTION

This invention concerns an improved method of applying an adhesive to flat carton blanks as well as an apparatus for and a method of converting such and other flat blanks into folding and rigid carton constructions.

Paperboard and synthetic carton blanks are commonly die cut from large sheets or rolls. The sheets or rolls may be printed, embossed, coated, and die cut in a continuous process of which die cutting is the final step. Paperboard blanks are often coated with a varnish during the printing process, whereby the finished surfaces are made more durable and gloss is imparted to them. The varnishes are formulated in varying degrees of hardness and gloss to suit specific applications, and typically comprise hydrocarbon solvents in combination with such solids as nitrocellulose, acrylics, and vinyls, or combinations thereof, in concentrations of 25% to a maximum of 30%.

In such applications as milk cartons, the paperboard is coated with a relatively heavy layer of plastic ranging in thickness between 0.00075 inches (0.002 cm.) and 0.001 inches (0.0025 cm.).

In commercial practice, blanks are converted into carton constructions by machines which fold them into the prescribed form and interlock or bond certain of their overlapping portions. Bonding is accomplished with supplementary ahdesives or by heating to flow the plastic coatings present on the blanks from the time they are manufactured. An example of the latter is milk carton construction wherein ultrasonic energy, applied to the exterior side of one overlapping portion, heats to flow the plastic coating present at the sealing faces of both overlapping portions. Patents representative of this art include Pat. Nos. 3,224,915, 3,468,731, 3,905,280, 3,956,975, 4,251,303, 4,159,220, and 4,264,316. Carton blanks entirely comprised of thermoplastic materials may also be converted to cartons in this manner. Most carton constructions, however, are not intended for uses requiring heavy plastic coatings and, therefore, are commonly bonded where necessary with protein glue, synthetic liquid glue, or normally solid substances heated to flow. In some cases, the adhesive is applied during the manufacture of the blank and reactivated at the time the blank is erected. It is the more general practice, however, to apply the adhesive to the blank immediately prior to the forming process. In all cases of bonding overlapping portions of blanks by adhesive means, it is necessary to hold them together under pressure until sufficient bond has been developed to hold them in place.

Inherent in the processes and procedures described above, as implemented in accordance with the prior art, are costs in time, materials, and energy which may be mitigated by the practice of the present invention.

SUMMARY OF THE INVENTION

According to the invention box blanks are coated at sealing portions thereof with a varnish comprising thermoplastic solids in a liquid vehicle and with the solids being present in a sufficient amount to form a thermoplastic seal on activation. The sealing portions are joined by exposing the portions to a sonotrode to seal the portions. The varnish has a solids content of from about 30 to about 60% and preferably 30 to 50% by weight so that it can act as a protective layer for the box blank when applied wholly thereover or merely as a seal when applied to the sealing portions. Preferably the rate of application is from about 4 to about 10 grams per square meter.

In the box forming preferred method, a sonotrode and backup anvil are used and arranged so that projections protrude from the anvil with the sealing area of overlapped sealing portions of the box blank having the projections biting into those portions to effectively deliver ultrasonic energy near to a thermoplastic seal line thus reducing the distance between the anvil sealing surface and sonotrode to increase the effect of ultrasonic energy used to form the seal.

Preferred sheet material box blanks in accordance with the invention carry a printed coating formed of a varnish having thermoplastic solids in a liquid vehicle with the solids being present in a sufficient amount to form a thermoplastic seal at overlapping portions. The varnish can be applied over messages and decorations previously printed on the box blanks. The blank is preferably a flat carton blank having planar base, side, end and sealing flap elements coated wholly or in part by a varnish applied by printing means and comprising a bonding medium when heated to a tacky state.

The preferred apparatus of this invention for sealing foldable sheet material box blanks of rigid sheet material, has an anvil surface adapted to receive a box corner with overlapped flaps adjacent thereto and positioned in contact with ends of projections from a surface of the anvil. A sonotrode is mounted for relative movement toward and away from the anvil surface to compress portions of the flaps and maximize utilization of ultrasonic energy applied to the flaps and thus form a seal between the flaps utilizing the thermoplastic material previously coated on at least one of the flaps.

The blanks are preferably coated when substantially planar prior to being die cut but can be coated wholly or partly on one or both sides, after die cutting into individual blanks. Preferably the coating is carried out by high speed printing means where a varnish is applied with a solids content ranging from about 30 to about 60% by weight preferably applied at a rate of from about 4 to about 10 grams per square meter. The projections from the anvil preferably are thin needle-like or ridge-like projections which bite into and compress paper or other stock material of the blanks without piercing the material from side to side but getting an effective backup anvil closer to a joint between two flaps than would be the case if the anvil and sonotrode were left in planar facing arrangement squeezed toward each other with the flaps therebetween.

It is an object of this invention to provide flat carton blanks carrying on their overlapping sealing portions a novel form of adhesive which is stable until activated by ultrasonic energy.

Another object of this invention is to impart latent adhesive properties to sealing portions of a blank by modification of the varnish coating widely used for other purposes.

Another object of this invention is to apply the adhesive utilizing coating techniques and coating equipment common to the art of manufacturing flat carton blanks.

Another object of this invention is to provide a method whereby the adhesive may be applied by printing means to at least one of each pair of surfaces which are to be adhered together in the final carton construction.

Still another object of this invention is to provide a simple, versatile apparatus for erecting the flat blanks and for welding their sealing surfaces by means of ultrasonic energy.

A still further object of this invention is to achieve higher rates of carton production and lower rates of energy expenditure by means of making the applied ultrasonic energy more effective.

It is a feature of this invention that only one flap surface of two flaps to be overlapped and joined need be coated with the varnish yet a suitable thermoplastic heat seal can be formed therebetween. A thermoplastic polymeric solid material can be carried in a liquid vehicle and deposited by printing techniques on a part of all of a surface to be coated. Thus the part over joining flaps can be utilized for sealing while the part of the liquid vehicle carrying solids covering the remainder of the box blank can impart desired protective and decorative function to the box blank. The use of thermoplastic adhesive is minimized since extremely thin coatings can be provided since the liquid vehicle can be used to apply any desired solid level. Because a liquid coating is applied thinly, high speed oeration is possible such as production of 60 or 70 small box blanks per minute. The high speed production is obtained by the use of the adhesive printing method and also because the sonic apparatus used allows biting into the blanks of projections so as to get the energy desired closer to a weld line enabling use of reduced energy with faster heating possible.

BRIEF DESCRIPTION OF THE DRAWINGS

The above and other features, objects and advantages of the present invention will be better understood from the following specification when read in conjunction with the accompanying drawing in which:

FIG. 1 is a diagrammatic side cross section through a preferred embodiment in accordance with this invention showing a blank being fed into the apparatus;

FIG. 2 shows a subsequent step in the operation of the apparatus where the box blank is folded into a desired position with overlapping end flaps to be welded;

FIG. 3 is a still further step where sonotrodes are applied to the overlapping flaps;

FIG. 4 is an exploded and enlarged view of the right-hand end of the diagrammatic showing of FIG. 3;

FIG. 5 is a still subsequent step in the operation; and

FIG. 6 is the final step showing a second box blank being fed into the apparatus with the fully erected first blank being ejected therefrom.

DESCRIPTION OF PREFERRED EMBODIMENTS

According to the invention, at least one sealing surface of overlapping portions of a carton blank is partially or entirely coated with a varnish of high solids content. In some cases, the entire flat carton blank surface, as for example one entire planar surface of the carton blank, can be coated with a varnish prior to die cutting of individual blanks while still in sheet form, or after such die cutting. Preferably sheet or web stock is coated with varnish by high speed printing methods prior to being die cut into blanks. The varnish which is preferably transparent can be applied over printed material, informational material and/or coloring or decorative material on the blank. The blanks can be produced at one location and converted into cartons elsewhere. The varnish applied to the blanks is activated by ultrasonic waves which heat the sealing area at a joint plane interface between two overlapped flaps whereby the varnish is made at least pressure sensitive and tacky or sticky and thereby bonds firmly on cooling.

In the present method of joining carton blank parts such as flaps by using ultrasonic waves, a perfect and clean weld can be formed. There is no surplus adhesive squeezed out along the edges of the weld which could deface the finished carton.

The varnish applied to the blanks can vary greatly depending in part upon the absorption capacity of the sheet material from which the blanks are made. Such sheet material or stock can be conventional cardboard or paper stock as for example paper stock or cardboard having a thickness of from 0.010 to about 0.050 inches in thickness. The board material can also be thermoplastic materials, cardboard coated with thermoset materials and other conventional box forming materials.

The varnish can have a solids content of from 30 to 60% and preferably 30 to 50% by weight with an aqueous liquid vehicle suspending the solids. The liquid vehicle is preferably water but in some cases organic solvents can be used. When water is used, ammonia can be added. Preferably the varnish is applied at a rate of between 4 and about 10 grams wet weight per square meter although other coating weights can be used depending upon the stock material and the specific varnish. Similarly the viscosity of the varnish is preferably between 30 and 70 seconds at DIN cup 4 MM/20°. When ammonia is used with a water liquid vehicle or solvent, ammonia is preferably used between 50 and 70% of the liquid. The ammonia is preferably used in standard ammonia water form at a final mixture pH of 8.

The varnish is dried after application and preferably before die cutting. Drying can be carried out at room, ambient or elevated temperature to evaporate the liquid vehicle therein.

In preferred embodiments of this invention, the varnish is an acrylic resin varnish having a solids content of between 30 and 50%, a pH value of 8 to 9. For example, the varnish can be a 35% acrylic resin solids in 65% water containing ammonia and having a pH value of 8, a density of 1.04 grams per milliliter and a viscosity of 30 seconds DIN. The varnish can be coated on a paper stock carton blank (cardboard) with a coating weight of 7 grams per square meter. Such a varnish when used on a single surface of a flap to which an uncoated corresponding flap is to be adhered to form a seal joint, can be sealed at a temperature of 100° to 160° C. while pressure of from 80 to 120 KP is applied using ultrasonic energy of a 350 to 700 W generator at 40 kilohertz and employing a welding time of from 0.2 to 0.3 seconds.

Often wet varnish coatings of from 0.0004 to 0.0010 centimeters in thickness are sufficient to form good heat seals when welded as described above.

In another specific example, a varnish is formed with approximate proportion of the ingredients being 40% acrylic resin and approximately 60% solvents which is preferably water with an addition of ammonia. This varnish has a high viscosity whereby the volume of flow measured with a 4 m/m DIN cup is approximately 60-70 seconds.

The application of this varnish to the various blanks or parts thereof is for all practical purposes best done by printing methods such as offset or gravure. The quantity of varnish to be applied should be around 7-8 grams/wet weight per sqm.

High speed coating techniques such as skim coating, roller coating, reverse roller coating, air knife coating and the like can be used.

To assure constant delivery of the varnish to the the coating apparatus, it is an advantage to keep it in a container fitted with a cylindrical mold (agitator tank) and a pump preferably of the centrifugal variety. This is in effect a means for keeping the varnish uniformly mixed by constant agitation until the time of application to the blank stock.

After the varnish blank stock has been coated and the coating has set, it is die cut for further processing into cartons. To continue the process of this invention it is advantageous to use an apparatus which is coordinated with the erecting tool. At least one ultrasonic unit is movably mounted and synchronized with the operation of a tool plunger to press together the carton flaps to be welded, whereby a piston mounting the ultrasonic unit slides out exerting the required pressure to the carton flaps and then immediately returns to its previous position.

If the blanks to be used are in part or throughout coated with synthetic material then the parts to be welded are heated by ultrasound at the connecting areas so that they can be welded intensively, particularly when the heat of the ultrasonic unit is pressed firmly against the carton parts to be welded, whereby the plunger of the erecting tool inside the carton being formed acts as anvil. If on the other hand the blanks to be erected are made of uncoated cardboard, then the varnish of high solid value having been applied to the necessary parts in the manner described heretofore is reactivated by the ultrasonic equipment and thereby made weldable.

The effect of ultrasonic equipment can be further enhanced by providing projections on the parts of the plunger of the erecting unit which then serve as anvil being immediately opposite the ultrasonic units. This would increase the specific area pressure during the application of the ultrasonic unit. These projections can be in the form of pins. They can have blunted tips. They can also be developed as shaped ribs. The projections compress parts of the board of the blanks which are to be welded, so that the distance between the plunger 6 and the sonotrode facing it is reduced thereby improving the effect of the ultrasound.

Furthermore it is of advantage if the apparatus as outlined in this invention is equipped with a number of such movable ultrasonic units which should appropriately operate jointly and in pairs being positioned opposite one another.

These ultrasonic appliances can also be moved pneumatically, and it is possible to adapt both the forward and retracting speed individually according to the circumstances by fitting rocker arms between the ultrasonic appliances and the pneumatic power unit.

The diagrammatic showing illustrates the following elements of an erecting unit for erecting box blanks:

| | |
|---|---|
| 1 | Erecting unit |
| 2 | Shaping plate |
| 3 | Opening in 2 |
| 4 | Forming well |
| 5 | Ancillary base |
| 6 | Plunger |
| 7 | Arrow |
| 8 | Sonotrode |
| 9 | Sonotrode |
| 10 | Arrow |
| 11 | Guide rod |
| 12 | Pneumatic cylinder |
| 13 | Pivot |
| 14 | Rocker arm (rocker disc) |
| 15 | Piston rod of 12 |
| 16 | Blank |
| 17 | Blank flaps of 16 |
| 18 | Outer frame of 6 |
| 19 | End flaps of 8 and 9 |
| 20 | Projections on 18 |
| 21 | Inside surface of 17 |
| 22 | Folding carton |

In FIG. 1 the strictly diagrammatic illustration of the erecting unit 1 shows a shaping plate 2 which in this case has a rectangular opening 3. Below the shaping plate 2 there is a firmly fixed forming well 4 which can be fitted with an ancillary base 5, if required as well as support guides which have not been particularly illustrated. Above the shaping plate 2 there is a plunger 6 moving downward in the direction of the arrow 7 through the opening 3 of the shaping plate 2 and through the forming well 4.

On both sides of the forming well 4 are the heads of the ultrasonic appliance, the sonotrodes 8 and 9, producing ultrasound. These sonotrodes 8 and 9 move horizontally in the direction of the arrows marked 10 along the guide rods marked 11 which in turn are connected to the pneumatic cylinder 12 as shown in FIG. 1. Here it is possible, as can be seen in FIG. 2, to fit a swivel-mounted rocker arm (rocker disc) 14 between the guide rod 11 and the pneumatic cylinder 12 which is mounted on a pivot 13 to which the guide rod 11 on the one hand and the piston rod 15 of the pneumatic cylinder 12 on the other are connected.

The operation of this apparatus according to the invention is as follows: first of all a cardboard blank 16 is put into position between the pulled up plunger 6 and the shaping plate 2 as seen in FIG. 1. Those parts of the blank which are to be welded together by ultrasound have received an offset printed application of varnish of high solid content which has meanwhile hardened. After feeding in this blank 16, made of board in this case, the plunger 6 moves down in the direction of arrow 7 taking the blank 16 with it, so that the flaps 17 are bent upward as they pass through the opening 3 in the shaping plate 2 thereby skimming the outer frame 18 of the plunger 6 as per FIG. 2. For the sake of clarity forming tunnel 4 and ancillary base 5 are left out in FIG. 2.

Once the procedure of erecting the flaps 17 of blank 16 is terminated, the pneumatic cylinders 12 allocated to the sonotrodes 8 and 9 go into action and push the sonotrodes 8 and 9 in the direction of the arrow 10 against the overlapped flaps 17 of the erected blank 16, the plunger 6 serving as counter support. As the sonotrodes 8 and 9 are positioned opposite one another, the pressure exerted by the pneumatic cylinders 12 is cancelled.

To increase specifically the area pressure of the flat ends 19 of the sonotrodes 8 and 9, the outer frame 18 of the plunger 6 to which projection pins 20 pointing at the ends of the sonotrodes 8 and 9 respectively have been fitted, serves as anvil as can be seen in FIG. 4. The inside surfaces 21 of the blank 16 and the parts of the plural overlapped flaps 17 which are to be welded together lie flat against these projection pins. If these projections have a ribbed surface or projecting points, then these ribs or points penetrate into the parts of the blanks pressed against them, thereby reducing the distance between the plunger 6 anvil surface and the sonotrode facing it which brings a corresponding increase of the effect of ultrasound. To achieve a direct contact between the end flaps 19 of the sonotrodes 8 and 9 and the overlapped side flaps 17 of the blank, it is possible to cut out sectors of the forming well 4 through which the sonotrodes 8 and 9 can pass. Incidentally the forming well has been omitted from the diagrams FIGS. 2 to 5.

When the ends 19 of the sonotrodes 8 and 9 press against the side flaps of the blank 17 and thereby against the projections 20 on the sides of the plunger 6, the ultrasound turned out by the sonotrodes 8 and 9 heats up the synthetic material of the blank if it is a thermoplastic sheet material blank or alternatively the coating of synthetic material which has been applied to the blank, thereby welding the side flaps together. If the blank 16 is made of cardboard and has a coating of varnish—as outlined earlier on—then this is likewise heated up by ultrasound and the adjacent flaps are welded together with this heated varnish of high viscosity. The sonotrode and projection carrying anvil arrangement thus can be used to form seals of thermoplastic material at overlapped flaps along a joint surface thereof no matter how the thermoplastic has been applied.

As per FIG. 5, the sonotrodes 8 and 9 press against the blank flaps 17 for a sufficient length of time to weld the synthetic material and/or to harden the varnish between the blank flaps 17 thereby completing the welded joint. The folded carton 22 is thereby produced.

Once this procedure is over, the sonotrodes 8 and 9 are retracted in the opposite direction of the arrows 10 returning to their starting point—as shown under FIG. 1 and 2—and the plunger 6 is pulled up in the opposite direction of the arrow 7. The support guides attached to the forming well 4 which are not specially illustrated, hold the finished carton 22 in position as shown in FIG. 5. When the plunger 6 has reached its original raised position, then a new blank 16 is fed onto the shaping plate 2, thereby enabling a repetition of the procedure outlined above. While moving down again, the plunger 6 erects the second blank 16 and thereby ejects the previously completed folding carton 22 downward.

FIG. 1 illustrated erecting unit 1 for erecting carton blanks 16, thereby producing folding cartons. This FIGURE also shows apart from a shaping plate 2 and a plunger 6, two sonotrodes 8 and 9 moving back and forth in the direction of the arrows 10. These sonotrodes 8 and 9 produce ultrasound which heats and subsequently welds or sticks together the flaps of the blank 17 which is either made completely of synthetic material or is a blank 16 which is coated with synthetic thermoplastic material or a varnish having a high solids content of thermoplastic material.

While specific embodiments of this invention have been shown and described above, many variations are possible.

While the carton shown diagrammatically in FIG. 1 is a rectangular carton formed from a rectangular die cut flat blank, which is folded up to have flaps at ends overlapping each other, other flap arrangements can be used as known in the art. In the example shown a lower base has a flat flap extending as an outer flap or end 17 being folded at a right angle from the ground plane to act as the end of the carton and two inwardly extending blank flaps from the front and rear sides as shown in FIG. 2, lie facing the anvil side with each end 17 facing the sonotrode side. This forms two facing surfaces at each end 17, one between each flap 17 extending from the front and rear sides and the single flap or end extending at a right angle from the bottom planar layer of the blank. In some cases, tubes can be formed from the varnish coated blanks of the preferred embodiment of this invention with overlapping edges ultrasonically or otherwise welded together by heat. Thus a number of combinations are possible in the shape of the carton blanks as well as the different portions to be varnish coated in the invention used. In some cases the ultrasonic apparatus will have use when carton blanks other than those as specifically described herein are to be sealed. Similarly the carton blanks of this invention carrying an outer varnish on either the flap areas of their entire surfaces, can be heat sealed by other techniques.

As has been described, carton blanks are coated wholly or in part with a varnish containing thermoplastic solids in sufficient concentration to allow the varnished surfaces to constitute an adhesive medium.

In formulating the varnish, account must be taken of such variables as the method by which it is to be applied, the characteristics of the substrate with which it must function, the mechanical properties and thickness of the stock from which the blanks are made, and the surface gloss and hardness desired in the finished carton. Finally, the varnish must leave deposited on the sealing surfaces enough thermoplastic solids to function adequately as an adhesive. The present method allows the range of formulations necessary to widespread and economical use in industry.

Blanks coated in accordance with the invention are preferably formed with their overlapping portions positioned as in the prescribed carton construction. The overlapping portions which are to be welded together are pressed between anvil surfaces and sonotrodes. The sonotrodes are energized for a time sufficient to render the varnished surfaces tacky, and the sonotrode is deenergized. The overlapping parts are held under pressure between the anvil surfaces and the sonotrodes until bonding has been effected, whereupon the sonotrode and anvil are drawn apart.

The forming and bonding process is accomplished with an apparatus comprising an open forming tool so made as to define the corners of the carton base fitted to fold the sides and overlapping portions into position as the blank is thrust into the forming tool by a plunger so made as to fit within the formed carton. The plunger serves also to provide anvil surfaces against which movably mounted sonotrodes may act to compress the overlapping portions of the blank and to effect bonding.

The anvil surfaces of the plunger preferably carry projections such as blunted points or ridges which, by concentrating the force applied by the face of each sonotrode, substantially compress the overlapping portions of the carton in patterns corresponding to those of the projections on the anvil surfaces, thereby bringing areas of the varnished sealing surfaces nearer to the face of the sonotrode and reducing the distance through which the ultrasonic energy must pass in order to activate the sealant. Thus, increased pressure and heat are brought to bear on critical sealing areas and the time and energy required to form the seals may be substantially reduced. This procedure can have the further effect of creating mechanical interlocking in the areas of the seals. It being generally true of sealed carton construction that the mechanical strength of the sealant greatly exceeds that of the material from which the carton is made, the sealed portions have far greater stiffness than does the body of the carton. When the carton is flexed, local stresses may cause tearing near the seals. Therefore, constructions which are less stiff at their sealed portions offer advantage. By means of anvil surfaces carrying projections appropriately spaced and of appropriate contact surface areas, and control of the applied ultrasonic energy, the stiffness of the sealed portions of the carton may be made more compatible with the mechanical properties of the material from which the body of the carton is made.

What is claimed is:

1. Method for forming cartons from sheet material blanks having sealing portions, said method comprising,
   coating said blanks at sealing portions thereof with a varnish comprishing thermoplastic solids in a liquid vehicle said solids being present in sufficient amount to form a thermoplastic seal,
   joining said sealing portions and positioning between a sonotrode face and back up anvil sealing surface carrying a plurality of spaced projections,
   compressing a sealing area of overlapped sealing portions with said projections biting into said portions to effectively deliver ultrasonic energy near to a seal line reducing the distance between said anvil sealing surface and sonotrode to increase the effect of ultrasonic energy used to form a seal
   and heat sealing said portions using said sonotrode to seal said portions.

2. A method in accordance with the method of claim 1 wherein said blanks are substantially flat when coated with said varnish,
   said coating is carried out by high speed printing means, p1 and die cutting said blanks prior to said joining and after said coating.

3. A method in accordance with the method of claim 2 wherein said varnish has a solids content of from about 30 to about 60% by weight and is applied at a rate of from 4 to about 10 grams/sq. meter.

4. A process in accordance with the process of claim 1 comprising applying said varnish by high speed printing techniques and at a solids content of from 30 to 60% whereby said varnish can be heated and sealed by ultrasonic sound.

5. A process in accordance with the process of claim 4 wherein said varnish comprises 40% acrylic resin and approximately 60% of an aqueous solvent having a viscosity of from 60 to 70 seconds with a 4 m/m DIN cup.

6. A process in accordance with the process of claim 5 wherein the varnish is applied to the blank at a weight of between 7 and 8 grams per square meter with feeding means utilizing a pump.

7. A process in accordance with the process of claim 6 wherein said pump is a centrifugal pump feeding an offset printing machine to apply said varnish.

8. An apparatus for welding the overlapping portions of folding or rigid cartons formed from flat blanks coated on at least one side of each pair of overlapping portions with a varnish containing thermoplastic solids, said apparatus comprising
   an anvil surface with a plurality of discontinuous projections thereon, a sonotrode with a flat face,
   and means for clamping the said overlapping portions between the sonotrode and the anvil surface with sufficient force to compress the overlapping portions in contact with the said projections on the anvil surface, thereby reducing the distance between the sonotrode and the anvil at the welding interface of the two overlapping portions, increasing the pressure at the weld, and forming a mechanical interlock at each weld.

9. An apparatus in accordance with claim 8 and further comprising said anvil being aligned with said ultrasonic sound producing sonotrode and acting in conjunction with a folding unit for folding a carton blank to be fed between said anvil and said sonotrode.

10. An apparatus in accordance with claim 9 and further comprising a second sonotrode opposed to said first-mentioned sonotrode and mounted for simultaneous relative movement toward and away from said anvil whereby said sonotrodes apply equal and opposite force simultaneously against said anvil.

11. A method for forming rigid cartons from flat blanks coated wholly or in part with a varnish containing thermoplastic solids in an amount sufficient to constitute a bonding medium when activated by heat, said blanks being die cut to provide base, side, end, and overlapping flap elements, said method comprising
   placing the blank over an open female forming die so made as to define the corners of the carton base element, and to fold inward the side, end, and overlapping flap elements,
   pressing the blank into the said open forming die with a plunger having projections on those of its surfaces which face each pair of carton elements which are to be bonded,
   bringing the flat face of a sonotrode against the outer of each pair of elements to be bonded with pressure sufficient to cause the projections on the surfaces of the plunger opposite to compress the said pair of elements in contact therewith, thereby reducing the distance between each sonotrode and the anvil at the welding interfaces of the pair of elements to be bonded,
   energizing the sonotrodes to heat the bonding medium to at least a tacky state,
   deenergizing the sonotrodes while holding them under pressure against the outer surfaces of the formed carton until the bond has been effected,
   and withdrawing the sonotrodes to their initial positions.

* * * * *

UNITED STATES PATENT AND TRADEMARK OFFICE
CERTIFICATE OF CORRECTION

PATENT NO. : 4,588,390
DATED : May 13, 1986
INVENTOR(S) : Jurgen Heitele and Rudolf Kemmler It is certified that error appears in the above—identified patent and that said Letters Patent is hereby corrected as shown below:

Column 9, line 34, please change "comrishing" to --comprising--;
        line 52, please delete "pl".

Signed and Sealed this

Ninth Day of September 1986

[SEAL]

Attest:

DONALD J. QUIGG

Attesting Officer     Commissioner of Patents and Trademarks